US007912165B2

(12) United States Patent
Herzinger et al.

(10) Patent No.: US 7,912,165 B2
(45) Date of Patent: Mar. 22, 2011

(54) DIGITAL RECEIVER SYNCHRONIZATION

(75) Inventors: Stefan Herzinger, Sauerlach (DE);
Andreas Menkhoff, Oberhaching (DE);
Stefan Meier, Neubiberg (DE); Norbert Neurohr, Neuried (DE)

(73) Assignee: Infineon Technologies AG, Neubiberg (DE)

( * ) Notice: Subject to any disclaimer, the term of this patent is extended or adjusted under 35 U.S.C. 154(b) by 886 days.

(21) Appl. No.: 11/753,728

(22) Filed: May 25, 2007

(65) Prior Publication Data

US 2007/0286314 A1 Dec. 13, 2007

(30) Foreign Application Priority Data

May 26, 2006 (DE) .................. 10 2006 025 042

(51) Int. Cl.
*H04L 7/00* (2006.01)

(52) U.S. Cl. ........ 375/354; 375/355; 375/365; 375/366; 375/367; 375/368; 375/369; 375/370; 375/130; 375/136; 375/137; 375/142; 375/143; 375/144; 375/145; 375/147; 375/148; 375/149; 375/150; 375/324; 375/325; 375/342; 375/343

(58) Field of Classification Search .................. 375/130, 375/136–137, 172–175, 147–150, 316, 324–325, 375/342–343, 354–355, 365–370
See application file for complete search history.

(56) References Cited

U.S. PATENT DOCUMENTS

| 4,984,249 | A | * | 1/1991 | Long et al. ..................... 375/293 |
| 5,778,338 | A | | 7/1998 | Jacobs et al. |
| 6,621,855 | B1 | * | 9/2003 | Van Stralen et al. .......... 375/142 |
| 7,003,063 | B2 | | 2/2006 | Mill |
| 2002/0070845 | A1 | * | 6/2002 | Reisinger et al. ............ 340/5.61 |
| 2003/0091108 | A1 | * | 5/2003 | Tanaka .......................... 375/150 |
| 2005/0070809 | A1 | * | 3/2005 | Acres ............................ 600/508 |

FOREIGN PATENT DOCUMENTS

WO  03101002  12/2003

* cited by examiner

*Primary Examiner* — Mohammad H Ghayour
*Assistant Examiner* — Sophia Vlahos
(74) *Attorney, Agent, or Firm* — Dicke, Billig & Czaja, PLLC

(57) ABSTRACT

A method is disclosed, including identifying a preamble in a frame, where the preamble has a preamble length 1. M data items received in succession are stored. The m data items once divided into n portions, where the data items in each portion have respectively been received at successive times and where m and n are natural numbers and the following applies to m and n: m>n, m>1, n>1. The n portions are respectively correlated to the expected values to form component correlation results. Delaying the component correlation results, with at least two component correlation results being delayed by different lengths. The method also includes combining the delayed component correlation results to form a total correlation value. The total correlation value is used to determine whether the m received data items contain the preamble of a frame.

19 Claims, 3 Drawing Sheets

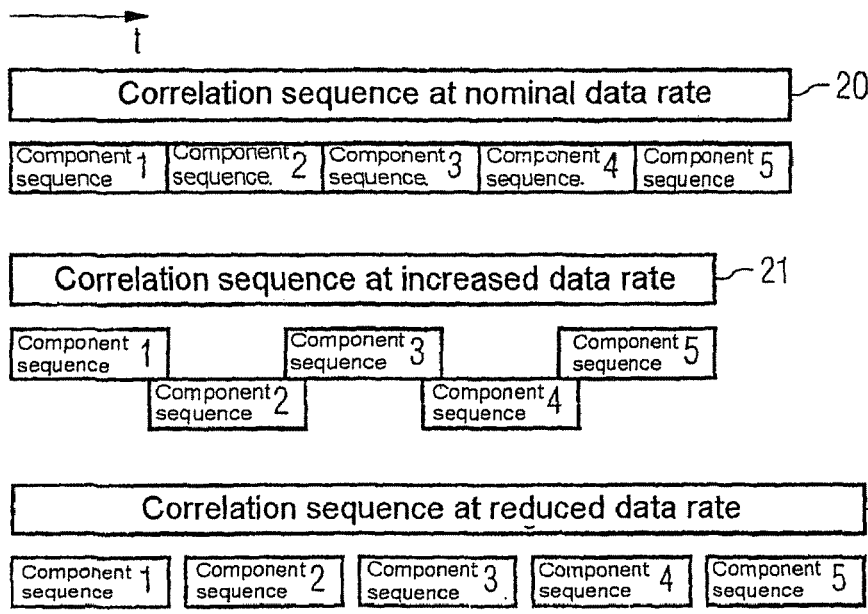
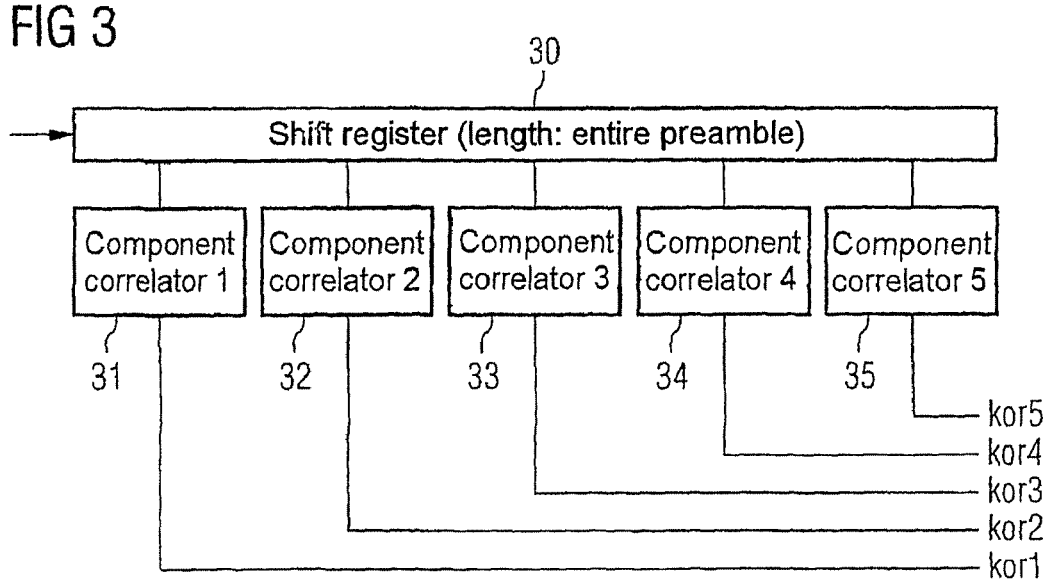

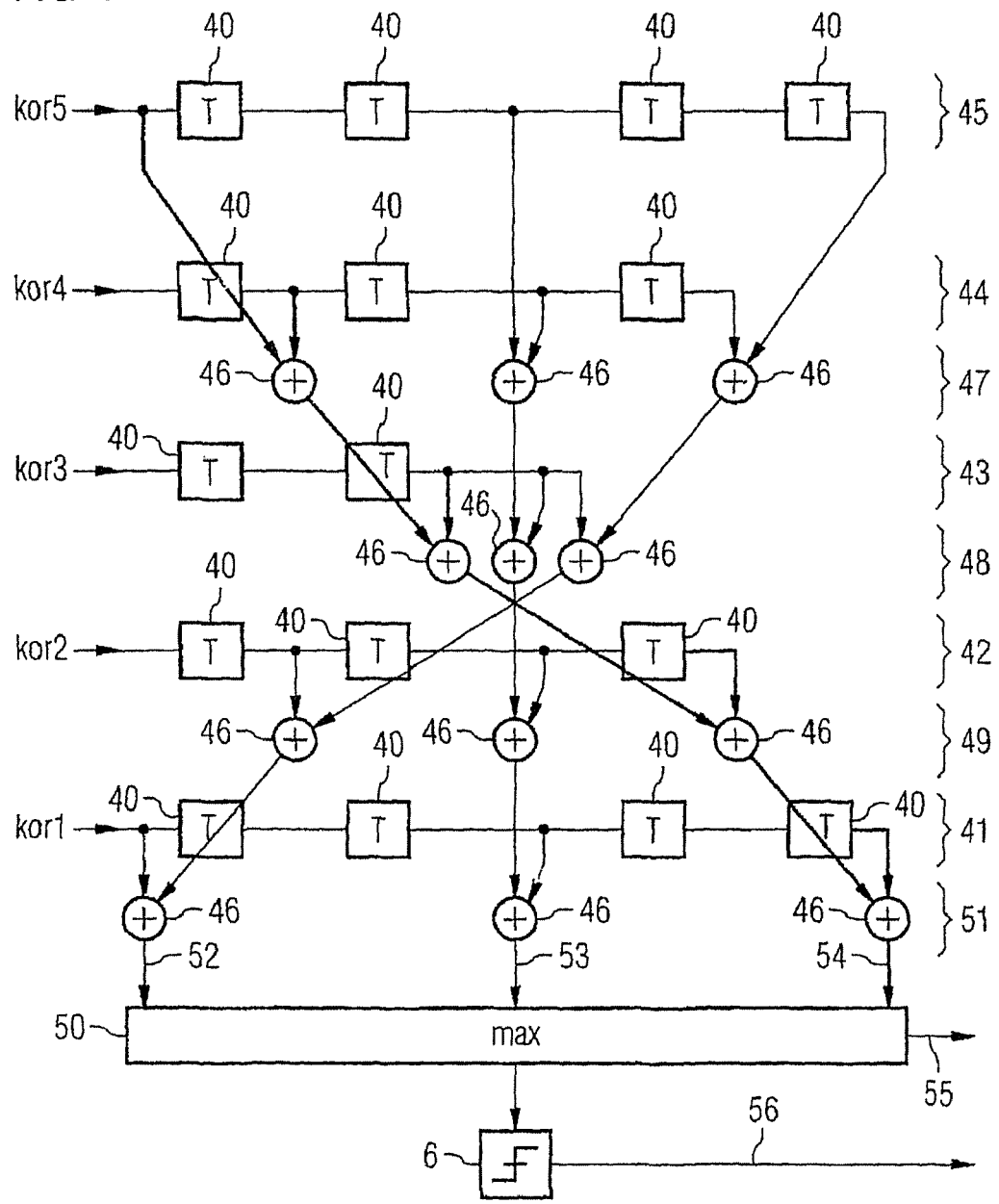

DIGITAL RECEIVER SYNCHRONIZATION

CROSS-REFERENCE TO RELATED APPLICATIONS

This Utility Patent Application claims priority to German Application No. DE 10 2006 025 042.7, filed May 26, 2006, which is herein incorporated by reference.

BACKGROUND

The invention relates to synchronization of a digital receiver in a manner which is tolerant of data rate errors.

For data transmission, a distinction is drawn between synchronous and asynchronous transmission. In the case of synchronous transmission, the clock generators of the transmitter and the receiver are in sync with one another. In the case of asynchronous transmission, the clock generators of the receiver and the transmitter nominally provide the same frequency but run independently of one another. This means that an at least small frequency difference is inevitable.

Even with asynchronous transmission, the receiver must be able to identify when useful data are applied to the input of the receiver. This is done by using synchronization. A frame which is to be transmitted therefore includes a preamble and useful data. The preamble is used by the receiver to identify the start of a new frame.

To identify the preamble, U.S. Pat. No. 7,003,063 involves the production of a modulated reference signal which corresponds to an expected modulated preamble. By correlating the reference signal to a received signal, it is established whether a preamble has been transmitted. However, such a method is susceptible to fluctuations in the data rate, which can result in transmission errors.

For these and other reasons there is a need for the present invention.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 2 illustrates how a preamble is identified by using component sequences.

FIG. 3 schematically illustrates a first portion of a circuit for identifying a preamble.

FIG. 4 illustrates the second portion of the circuit for identifying a preamble.

DETAILED DESCRIPTION

Figure 1:
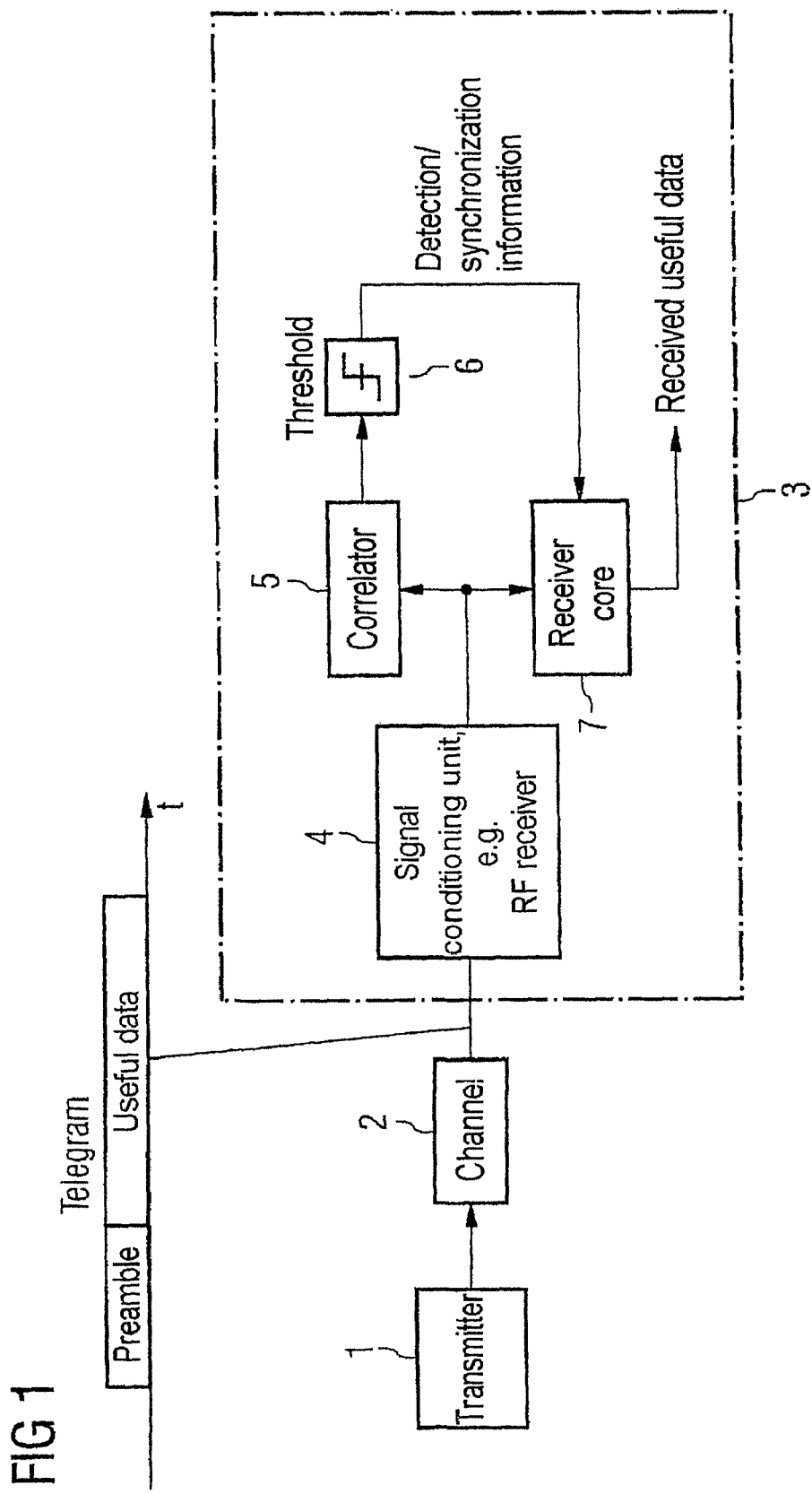
FIG. 1 illustrates a transmitter/receiver assembly which contains an inventive circuit for identifying a preamble.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

One or more embodiments provide a method for digital receiver synchronization including identifying a preamble in received data items, where the preamble is reliably identified even when there are fluctuations in the data rate. One or more embodiments provide a receiver which works reliably even when there are fluctuations in the data rate.

One or more embodiments provide a method for identifying a preamble in a frame in data items. In this case, the preamble has a preamble length 1. M data items received in succession are stored. The data items can be received by a transmitter, for example by using radio transmission or via an electrical line. It is also possible for the transmitter to be located in a circuit, for example, which is accommodated in the same chip as the receiver.

The m data items are divided into n portions, where the data items in each portion have respectively been received at successive times. The first portion contains a series of data items which were received first, the second portion contains the data series which was received second in time, etc.

In this case, there may also be an interval of time between the first portion and the second portion, so that yet further data items have been received between the first portion and the second portion. m and n are natural numbers, with the following being true: m>n, m>1 and n>1.

Each of the n portions is correlated to expected values to form a respective component correlation result. Thus, at least n component correlation results are obtained. The component correlation results are subsequently delayed, with at least two component correlation results being delayed by different lengths. The delayed component correlation results are combined to form a total correlation value, and this total correlation value is used to determine whether the received data items contain the preamble of a frame.

The splitting into a plurality of component correlations and the respective delays for the component correlation results allow the preamble to be identified even for an altered data rate. According to the variation in the data rate, the delays are set such that the preamble is still identified despite this variation. This forms a correlator which is tolerant of data rate errors and which is of interest particularly for transmissions with high tolerances. High tolerances are often a consequence of inflexible constraints regarding the costs of a system. By way of example, these are communication systems which have to cope without a crystal.

Besides detecting that useful data are applied to the input of the receiver, the synchronization can also have the function of symbol synchronization ("Where is the symbol center?") and frame synchronization ("Where is symbol No. 1 in the telegram?"). Depending on the properties of the physical plane, further tasks may also be added to this.

In one embodiment, the following is true: m>1. This means that more data items are stored than the length of the preamble. This is important if the data rate of the received data items is slower than the nominal data rate. In this case, it may arise that storing all of the received preambles requires more memory locations than required by the preamble in the nominal case.

In another embodiment, the process of respectively delaying the component correlation results and of combining the component correlation results are respectively performed multiple times. In addition, the process of combining component correlations involve a multiplicity of component correlation results being produced. It is established that the m received data items contain the preamble of a frame if at least one of the total correlation results illustrates that the preamble is contained in the received data items.

The process to be performed multiple times with the different delays check the presence of the preamble for different data rates. This is particularly necessary in systems in which the data rate fluctuates and is not known in advance. A comparison of the total correlation results is used to identify the data rate at which the preamble was received. The synchronization information therefore also provides an estimate of the data rate. This can be used in the receiver core in order to recover the clock in the receiver core which decodes the useful data.

The multiple process of respectively delaying the component correlation results can be combined at parallel times, in the same way that the multiple processes of combining the component correlation results can also be performed at parallel times. As a result, preamble identification is carried out for a plurality of data rates simultaneously, which saves time.

In addition, the process of determining whether one of the total correlation results illustrates that the preamble is contained in the m received data items can be performed at parallel times. This parallelization also advantageously reduces the time taken to identify a preamble.

As an alternative, the largest total correlation result from the total correlation results is ascertained and is used to determine whether the preamble is contained in the m received data items.

N is chosen such that the following is true: n<10. With greater component correlations, there is the risk that discrepancies of just 10% of the data rate would already cause a symbol to drop out of the correlation window over the length of the sequence, i.e. this symbol is no longer present in the data items which are correlated to the expected values. The length of the component sequences is oriented to the maximum discrepancy in the data rate. In line with the stated example of 10% discrepancy, splitting into component sequences of length 8 is a sensible compromise, for example. The length 10 would already have caused one symbol to drop out of the correlation window over the length of the sequence.

For m, values are chosen for which the following is true: 15<m<41. Such a length of the stored data normally ensures safe synchronization even in the case of additive noise or other interference. Safe synchronization normally requires preamble lengths 1 of between 16 and 32. Longer preamble lengths would mean a higher level of complexity for the transmission and for the calculation in the receiver.

In one embodiment, the difference between the longest and the shortest delay in the step of respectively delaying the correlation results is chosen such that this difference is greater than 6% of the nominal data rate of the received data items. This means that even relatively large fluctuations in the data rate can be identified.

In one embodiment, the method is used in a system in which data items are transmitted wirelessly using a signal which has a frequency in the range from 100 MHz to 1 GHz. By way of example, such systems are used in "keyless go" systems in which the clock generators in the transmitter and receiver do not have a crystal but rather RC elements, for reasons of cost. In this case, usual frequency bands are at 433 MHz, 315 MHz and 886 MHz.

One or more embodiments also provide an electrical circuit for identifying a preamble in a frame. The preamble has a length 1. The electrical circuit has a memory which stores m successively received data items. In addition, the electrical circuit contains n component correlators. Each component correlator correlates a portion of the data items stored in the memory to expected values. This portion of the data items is respectively of a nature such that the data items in this portion have been received in succession. The result of the correlation is output on an output of the component correlator. The electrical circuit also has a combiner which combines the output signals from a plurality of component correlators. This may be an adder or a multiplier, for example. In this case, the output signals from at least two component correlators are delayed by different lengths, however, so that the combiner combines output signals delayed by different lengths from the component correlators. There may also be more than two component correlators, with the delays in the output signals from all the component correlators all differing from one another.

A decision block in the electrical circuit receives an output signal from the combiner and indicates whether the preamble is present in the received data items.

The electrical circuit is also used to identify a preamble at a data rate which differs from a nominal data rate.

In one embodiment, m is >1. This means that the preamble can also be stored in the memory if the data rate is slow and the preamble therefore requires more space in the memory.

In one embodiment, the output of each component correlator has a plurality of delay elements. In addition, a plurality of groups of adders are provided, where each group of adders adds the output signals from delay elements for all the component correlations. The groups of adders differ in that they are connected to outputs of different delay elements. Hence, the group of adders respectively adds differently delayed output signals from the component correlators. In this case, a simultaneous check can be performed for a plurality of data rates to determine whether the preamble is present in the m data items.

In one embodiment, the memory storing the successively received data items is in the form of a shift register. The shift register simplifies the reception of the data items because each newly received data item is easily inserted into the first register of the shift register. In one embodiment, the delay by the longest delay element is 6% of the nominal data rate longer than the length of the shortest delay element. This makes it possible to compensate for large fluctuations in the data rate and allows reliable operation.

If the electrical circuit is integrated in a chip then a particularly compact design is obtained and it is also possible to process high frequencies, for example frequencies greater than 100 MHz.

FIG. 1 illustrates a transmission system having a transmitter/receiver assembly. The transmission system contains a transmitter 1, a channel 2 and a receiver 3. The receiver 3 has a signal conditioning unit 4, a correlator 5, a threshold value identifier 6 and a receiver core 7. The signal conditioning unit 4 has its output connected to the correlator 5 and to the receiver core 7. The output of the correlator is received by the threshold value detector 6, which for its part outputs a detection/synchronization information item to the receiver core 7. The receiver core 7 for its part outputs the received useful data for further processing in the receiver 3.

The transmitter 1 sends a frame, which is also called a telegram and includes a preamble and useful data, via the channel 2 to the receiver 3. In one embodiment, the channel 2 is a wireless link using radio transmission. However, the transmission can also be effected using an electrical or optical line. It is also possible for the transmitter and the receiver in the same semiconductor component to be situated on different chips or on the same chip.

The signal conditioning unit, which is an RF receiver, for example, forwards the received data items to the correlator 5 and the receiver core 7. In one embodiment, the signal conditioning unit contains a demodulation unit; in another embodiment, the transmitted baseband signal is transmitted directly.

The correlator 5 compares whether the received data items correspond to a preamble. If the initial value of the correlator exceeds a particular threshold, the threshold value detector 6 outputs an information item to the receiver 7 indicating that useful data are subsequently present which the receiver core 7 then forwards.

FIG. 2 illustrates the method for identifying preambles in a frame using three examples. The correlation sequences 20, 21 and 22 have been received at different data rates. In this case, a correlation sequence denotes a sequence of data items whose length is equal to the length 1 of a preamble. The correlation sequence 20 has been transmitted at nominal data rate, the correlation sequence 21 has been transmitted at increased data rate and the correlation sequence 22 has been transmitted at reduced data rate. For this reason, the correlation sequence 21 is shorter and the correlation sequence 22 is longer than the correlation sequence 20.

The various data rates result from different frequencies of the clock generators for the transmitter and receiver. By way of example, the difference may be due to the fact that the clock generators do not contain a crystal but rather RC elements, as is the case with "keyless go" systems in automobiles, for example.

The correlation is carried out using a plurality of component correlations. There are five component correlations which respectively correlate a portion of the correlation sequences 20, 21 and 22 to a component sequence 1, 2, 3, 4 or 5. In this case, the correlation sequence 20 is split into five cohesive portions. Each of these portions is individually correlated to a respective different component sequence.

The correlation sequence contains the received data items arranged next to one another, with the first data item received being provided on the right and the last data item received being provided on the left.

The correlation sequence 21 is likewise correlated to the component sequences 1, 2, 3, 4 and 5 using five component correlators. In this case, respective portions of the correlation sequence 21 are correlated to a respective component sequence. In this case, the portions of the correlation sequences which are compared with different component sequences overlap in comparison with transmission at nominal data rate, however. The portion of the correlation sequence 21 which is correlated to the component sequence 1 partially overlaps that portion which is correlated to the component sequence 2.

If the correlation sequence 21 contains 30 data items and each of the component sequences 1 to 5 contains eight data items, for example, then the received data items 1 to 8 are correlated to the component sequence 5, the data items 6 to 14 are correlated to the component sequence 4, the data items 12 to 20 are correlated to the component sequence 3, the data items 18 to 26 are correlated to the component sequence 2 and the data items 24 to 30 are correlated to the component sequence 1.

The correlation sequence 22 is longer than the correlation sequence 20, since the data rate of the received data is reduced in comparison with the clock rate of the receiver. The correlation sequence 22 is likewise correlated to the component sequences 1 to 5, in each case in individual component correlators. In this case, the correlation sequence contains five portions which are respectively compared with the component sequences. However, these portions are not cohesive, but rather there are additional data items between these portions. If the correlation sequence contains 48 data items, for example, then its first eight data items are correlated to the component sequence 5, the data items 10 to 18 are correlated to the component sequence 4, the data items 20 to 28 are correlated to the component sequence 3, the data items 30 to 38 are correlated to the component sequence 2 and the data items 40 to 48 are correlated to the component sequence 1.

If the frequency difference between the transmitter and the receiver is known then one of the methods can be applied in line with the correlation sequence 21 or the correlation sequence 22. If the fluctuation in the data rate is not known in advance then it is recommended that all three correlations be performed simultaneously on the basis of correlation sequences 20, 21 and 22. In this case, the method is also not limited to three simultaneously performed correlations, but rather can be extended by further parallel correlations.

FIG. 3 illustrates a first portion of an electrical circuit for identifying a preamble. It contains a shift register 30 and five component correlators 31, 32, 33, 34, 35. The shift register 30, into which m data items are inserted, is filled with the received data items from the left. The component correlators 31, 32, 33, 34, 35 respectively receive a portion of the data items received in the shift register 30. In this case, the component correlator 5 receives the data items received first and the component correlator 1 receives the data items received last. The component correlators 31, 32, 33, 34, 35 respectively output a correlation result kor1, kor2, kor3, kor4 and kor5. These correlation results respectively provide information about the extent to which the portion of the data items stored in the shift register 30 respectively matches a component sequence. A correlation is usually performed using multipliers and on adders. For a correlation of length n, n multipliers and n−1 adders are required.

If the received data items match the component sequence exactly then the correlation peak is acute in its timing and has a high peak value. With a slight discrepancy, the maximum becomes wider and lower.

FIG. 4 illustrates the second portion of an electrical circuit for identifying a preamble. This portion contains five delay element groups 41, 42, 43, 44 and 45 which respectively have a multiplicity of delay elements 40. In addition, the portion illustrated from the electrical circuit contains twelve adders 46, a maximum former 50 and the threshold value detector 6.

The first delay block 41 includes four series-connected delay elements 40, with the first delay element receiving the signal kor1. The second delay block 42 contains three delay elements 40. In this case, the first delay element 40 receives the signal kor2. The delay blocks 43, 44 and 45 include two, three and four series-connected delay elements, respectively, with the first delay element in the delay block 43 receiving the signal kor3, the first delay element in the delay block 44 receiving the signal kor4 and the first delay element in the delay block 45 receiving the signal kor5.

The twelve adders 46 are arranged in four adding blocks 47, 48, 49 and 51. In this case, the adders are connected up to one another such that the output signal 52 from the first adder 46 in the block 51 has the following value W(52).

$$W(52)=kor1+kor2'+kor3''+kor4'''+kor5''''$$

In this case, the number of primes ' denotes the number of delay elements after which the signal to be added is tapped off. By way of example, the signal kor4''' is tapped off at the output of the third delay element 40 in the delay block 44, and the signal kor1 is tapped off directly before it has passed through delay elements 40. The length of the delays in the delay elements 40 is the same in each case.

Accordingly, the signals 53 and 54 output the following values W(53) and W(54).

$$W(53)=kor1''+kor2''+kor3''+kor4''+kor5''$$

$$W(54)=kor1''''+kor2'''+kor3''+kor4'+kor5$$

The structure illustrated achieves addition staggered over time, which is illustrated here using the example of three data rate classes. All, in this case five, component correlator outputs are delayed. Then, outputs with a respectively short delay are added to outputs with a linearly increasing delay to form total correlation results.

The total correlation results are present on the outputs 52, 53 and 54 as W(52), W(53) and W(54). The combination to form a correlation result is also referred to as "combiner" or as "path". One of these three paths is illustrated in bold in FIG. 4. It runs from the signal kor5 via the first adders 46 in blocks 47 and 48 and via the third adder 46 in block 49 and the fourth adder 49 in block 51 to the signal 54.

The various combined component sequences are continued such that the maximum value is selected. If this value exceeds a suitably selected threshold then this means that both the synchronization time is stipulated and the data rate. To be precise, the data rate is a data rate range or a data rate class.

Depending on the number K of unit delays between the addition points, each total output corresponds to a data class. In this case, the paths for cases K are illustrated equal to −1, 0 and +1. The center of the class can easily be calculated: the center of the class, i.e. the center of the data rate range, can easily be calculated as follows:

Data rate (class N)=data rate (nominal)*(1+K*length of the unit delay/length of the component correlation).

For example in the case of component correlation with eight symbols and fourfold oversampling per symbol, respectively, the component correlation is 32 bits long. If the unit delay is the same length as the interval time between two successively received symbols then the example illustrated in FIG. 4 has three data rate classes whose centers are at −3.125%, 0 and +3.125% of the nominal data rate.

By adding additional paths, slightly greater discrepancies can be covered, resulting in five data rate classes of −6.25%, −3.125%, 0, +3.125%, +6.25%, for example. Finer resolution between the classes can be achieved by reducing the unit delay. This does not necessarily require an increase in the oversampling, since a delay by fractions of a sampling period can also be achieved with standard polyfiber structures.

If the portion of the data items in the shift register corresponds to a component correlation sequence then the component correlator outputs a corresponding signal. The better the correlation, the larger the output signal. The component correlation outputs are now combined with the paths to form total correlation outputs. If the input data rate matches the data rate of the respective path exactly then the correlation peak is acute in its timing and has a high peak value. With a greater discrepancy, the maximum becomes wider and lower. A simple maximum value decision can be used to detect the most suitable path. The output 55 of the maximum value determiner 15 outputs the information regarding which data rate class is present.

A threshold value decision is then used to stipulate whether a preamble is actually present. This information is output on the output 56 of the threshold value decision-maker 6.

The necessary computation operations are assessed as follows. Ordinary correlation of the length m requires m multiplications and m−1 addition. If p data rates are to be detected at the same time, accordingly p*m multiplications and p*(m−1) addition are required.

In the case of the method presented, splitting into n component correlators requires n*m/n=m multiplications and n (m/n−1)=m−n additions. This applies to the case in which n can be divided by m, as an exact value and otherwise as an approximation. Added to this are p*(n−1) additions in the paths. For an example of 32 symbols, 7 data rates and 4 component correlations with a length of 8 symbols and after fourfold ovesampling, the following is obtained:

|  | Multiplications | Additions |
| --- | --- | --- |
| For exact data rate | 128 | 127 |
| For seven data rate classes | 896 | 889 |
| Inventive method for seven data rate classes | 128 | 124 + 21 = 145 |

Added to this are additional operations for the maximum search in the maximum former 50 for the seven paths. The crucial saving on complexity comes from the reduction in the multiplications, however.

The component correlations are used to approximate the action of multiple correlators with different data rates. In this way, the approximate same action can be achieved with joint use of the component correlations which are to be calculated only once as when using p separate correlators which are each designed for a different data rate. If the component correlations are kept short enough (in line with the maximum discrepancy from the nominal data rate) then no noticeable loss of implementation arises through the approximation.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for synchronizing a receiver including identifying a preamble in a frame, where the preamble has a preamble length 1, comprising:
   storing m data items received in succession;
   dividing the m data items into n portions, where the data items in each portion have respectively been received at successive times and where m and n are natural numbers and the following applies to m and n: m>n, m>1, n>1;
   respectively correlating the n portions to expected values to form component correlation results;
   respectively delaying the component correlation results, with at least two component correlation results being delayed by different lengths;

combining the delayed component correlation results to form a total correlation value; and determining whether the m received data items contain the preamble of a frame based on the total correlation value, for synchronizing the receiver, wherein the processes of delaying the component correlation results and of combining the component correlation results are performed multiple times, wherein the processes of delaying the component correlation results differ in terms of the length of the delays, and the processes of combining the component correlation results involve a multiplicity of total correlation results being produced, and it is established that the m received data items contain the preamble of a frame if at least one of the total correlation results illustrates that the preamble is contained in the m received data items.

2. The method of claim 1, wherein the following additionally applies to m: m>1.

3. The method of claim 1, further including:
determining a data rate from the component correlation results.

4. A method including identifying a preamble in a frame, where the preamble has a preamble length 1, comprising:
storing m data items received in succession;
dividing the m data items into n portions, where the data items in each portion have respectively been received at successive times and where m and n are natural numbers and the following applies to m and n: m>n, m>1, n>1;
respectively correlating the n portions to expected values to form component correlation results;
respectively delaying the component correlation results, with at least two component correlation results being delayed by different lengths;
combining the delayed component correlation results to form a total correlation value; and
determining whether the m received data items contain the preamble of a frame based on the total correlation value, wherein the processes of delaying the component correlation results and of combining the component correlation results are performed multiple times, where the processes of delaying the component correlation results differ in terms of the length of the delays, and the processes of combining the component correlation results involve a multiplicity of total correlation results being produced, and it is established that the m received data items contain the preamble of a frame if at least one of the total correlation results illustrates that the preamble is contained in the m received data items.

5. The method of claim 4, wherein the following additionally applies to m: m>1.

6. The method of claim 4, wherein the multiple process of respectively delaying the component correlation results are performed at parallel times and
the multiple process of combining the component correlation results are performed at parallel times.

7. The method of claim 4, wherein the process of multiple determination of whether one of the total correlation results illustrates that the preamble is contained in the m received data items are performed at parallel times.

8. The method of claim 4, wherein the following additionally applies to n: n<10.

9. The method of claim 4, wherein the following additionally applies to m: 15<m<40.

10. The method of claim 4, wherein the difference between the longest and the shortest delay in delaying the component correlation results is greater than 6% of the nominal data rate of the received data items.

11. The method of claim 4, wherein the data items are transmitted wirelessly using a signal which has a frequency in the range from 100 MHz to 1 GHz.

12. A circuit for identifying a preamble having a preamble length 1 in a frame, which has the following:
a memory configured to store m successively received data items;
n component correlators where each component correlator respectively correlates a portion of the data items stored in the memory to expected values and outputs the result of this correlation on an output, and where the respective data items from the portion of the data items have been received in succession;
at least one combiner which combines output signals from a plurality of component correlators, with the output signals from at least two component correlators being delayed by different lengths; and
a decision block which receives at least one output signal from the combiner and indicates whether the preamble is present in the received data items, wherein the output of each component correlator has a plurality of delay elements connected in series and has a plurality of groups of adders, where each group of adders adds the output signals from delay elements in all the component correlators and the groups of adders differ from one another in that they are connected to the outputs of different delay elements.

13. The circuit of claim 12, comprising wherein m>1.

14. The circuit of claim 12, comprising wherein the memory storing successively received data items is in the form of a shift register.

15. The circuit of claim 12, comprising wherein the longest delay element delays by at least Z time units longer than the shortest delay element, with Z time units corresponding to 6% of the nominal data rate of the received data items.

16. The circuit of claim 12, comprising wherein n<10.

17. The circuit of claim 12, comprising wherein the following is true: 15<m<40.

18. The circuit of claim 12, comprising wherein the circuit is part of a receiver in a "keyless go" system.

19. The circuit of claim 12, comprising where the circuit is integrated in a chip.

* * * * *